May 8, 1956     A. R. CHASAR     2,744,757
SELF-TIGHTENING CHUCK
Filed March 18, 1955     2 Sheets-Sheet 1
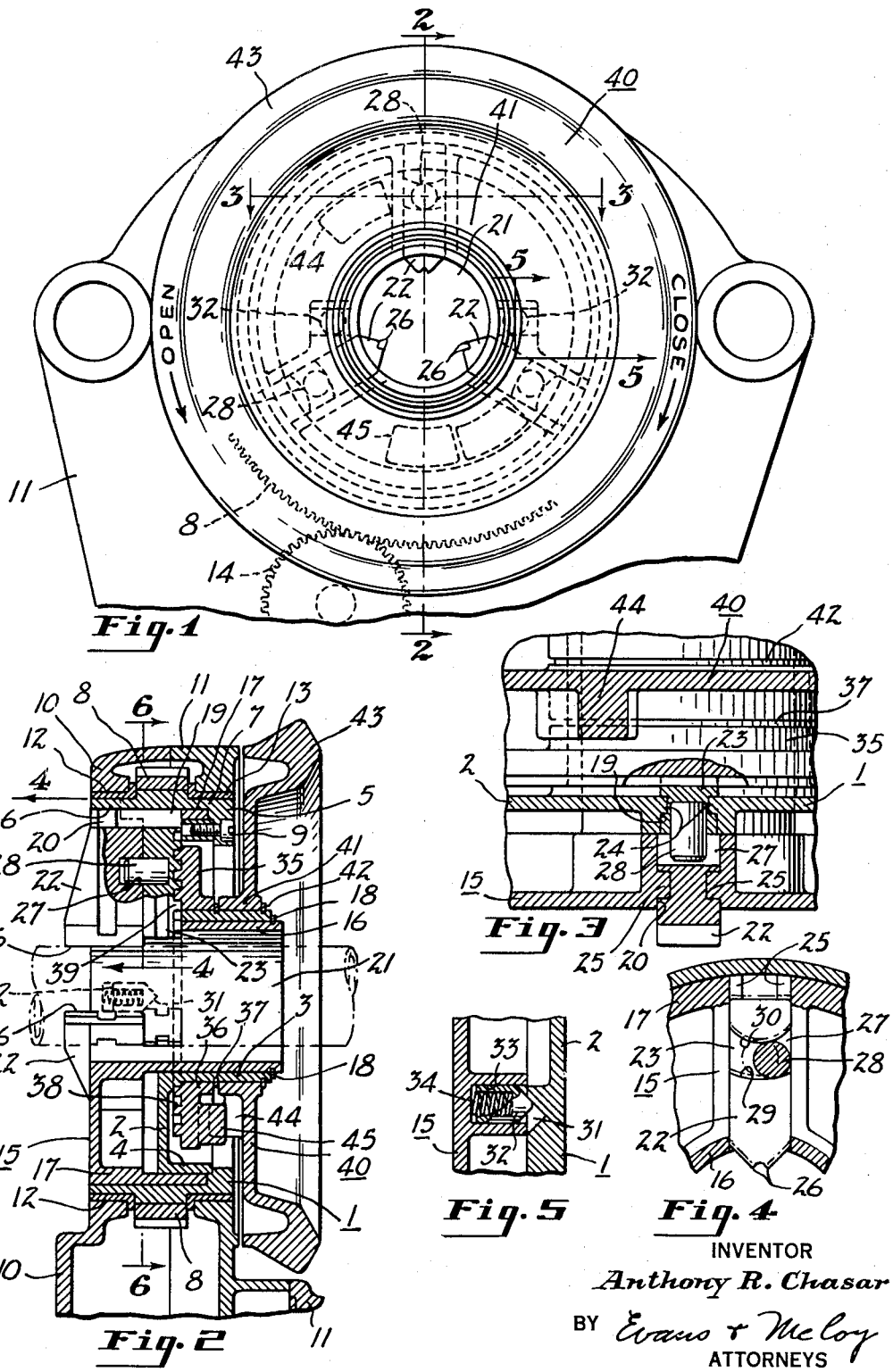
INVENTOR
*Anthony R. Chasar*
BY *Evans & McCoy*
ATTORNEYS May 8, 1956 A. R. CHASAR 2,744,757
SELF-TIGHTENING CHUCK
Filed March 18, 1955 2 Sheets-Sheet 2
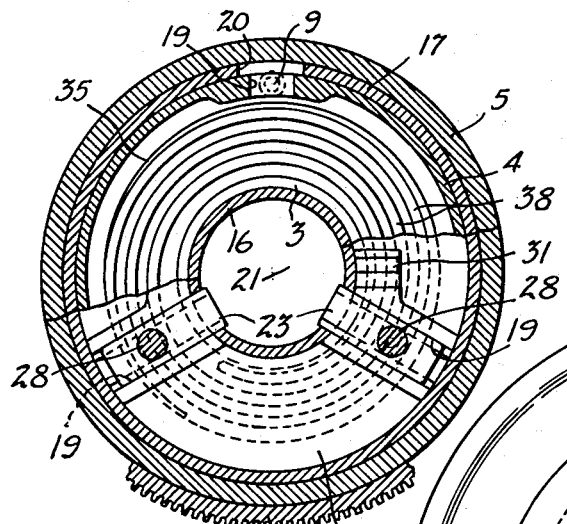
Fig. 6
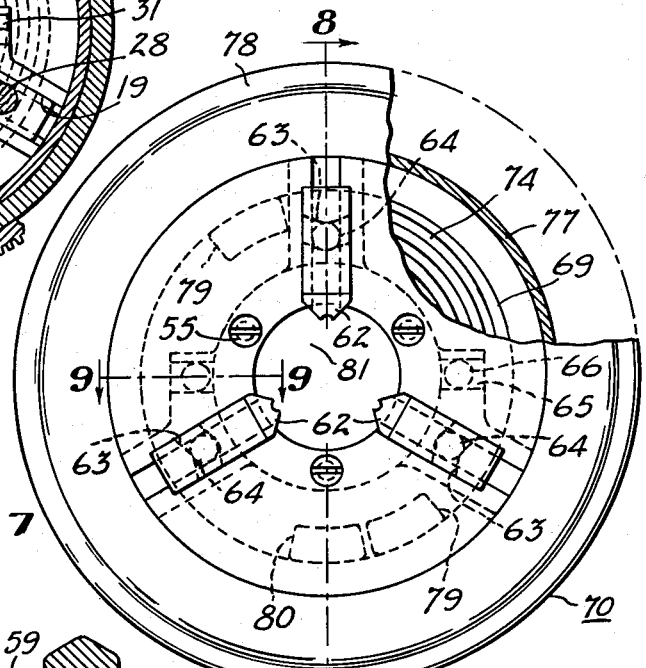
Fig. 7
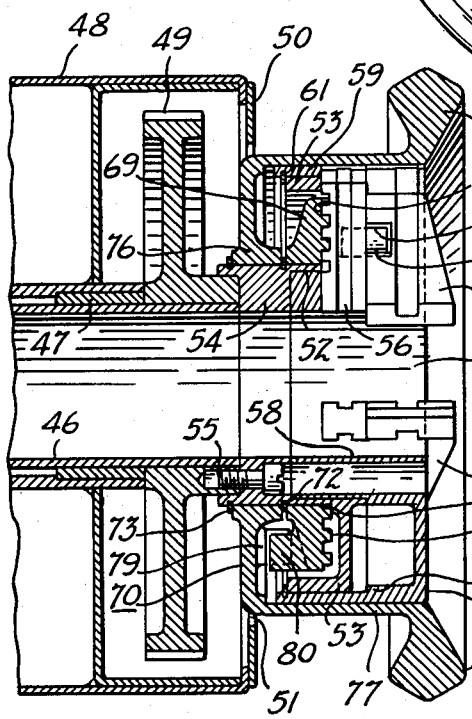
Fig. 8
Fig. 9
INVENTOR
Anthony R. Chasar
BY Evans + McCoy
ATTORNEYS

United States Patent Office 2,744,757
Patented May 8, 1956

2,744,757
SELF-TIGHTENING CHUCK

Anthony R. Chasar, Cleveland, Ohio, assignor to The Oster Manufacturing Company, Cleveland, Ohio, a corporation of Ohio Application March 18, 1955, Serial No. 495,127

20 Claims. (Cl. 279—114)

The present invention relates to self-tightening chucks and more particularly to chucks which are self tightening in both directions of rotation.

Self-tightening chucks have been well known in the art for many years, but such chucks had several disadvantages. The rotation of many of these chucks must be stopped or reversed to grip or release the work, and the chucks usually require power-operated gripping means or expensive and complicated mechanisms to permit gripping and releasing of the work without stopping the rotation of the spindle. Furthermore, such chucks were not self-tightening in more than one direction and were unsatisfactory where machining operations required rotation of the spindle first in one direction and later in the opposite direction relative to the cutting tool.

According to the present invention a chuck is provided which is self-tightening in both directions of rotation with respect to the cutting tool and which permits gripping or releasing of the work during rotation in either direction without stopping rotation of the chuck. Such chuck is particularly useful in connection with screw-thread-cutting machines for clamping a pipe or rod during the threading operation.

The chuck of the present invention comprises a spindle, a chuck body having radially movable clamping jaws, and cam means responsive to turning movement of the spindle in either direction with respect to the chuck body for moving the clamping jaws toward clamping position against the work, whereby turning of the spindle relative to the chuck body due to torsional thrusts exerted by the cutting tool on the work increases the gripping pressure on the work regardless of the direction of the torsional thrust.

Additional means are preferably provided for moving the clamping jaws radially into and out of gripping engagement with the work including a scroll mounted for rotation relative to the spindle and driving members carried by the spindle which move radially in the spindle and have teeth meshing with the scroll. Suitable cam means, such as a driving pin and a cam slot, may be provided for moving the clamping jaws radially in response to rotational movement thereof relative to the driving members and in response to radial movement of the driving members due to rotation of the scroll relative thereto.

Means is provided for rotating the scroll relative to the spindle to move the driving members and the clamping jaws radially. Such means is preferably in the form of a handwheel having an impact driving connection with the scroll so that the work can easily be gripped and released during rotation of the spindle in either direction by imparting a flip to the handwheel.

An object of the present invention is to provide a simple self-tightening chuck which is economical to manufacture, which is easy to operate, and which may readily be assembled and disassembled for purpose of manufacture or repair.

A further object of the intention is to provide a chuck which is self-tightening upon relative turning movement between the spindle and the clamping jaws regardless of the direction of rotation of the spindle with respect to the cutting tool.

A still further object of the invention is to provide a simple and inexpensive self-tightening chuck which can be instantly clamped to or released from a work piece during rotation of the spindle in either direction.

Other objects, uses and advantages of the present invention will become apparent from the following description and from the drawings in which:

Figure 1 is a front elevational view of the chuck of the present invention on a reduced scale;

Fig. 2 is a transverse vertical sectional view taken substantially on the line indicated at 2—2 in Fig. 1 and on the same scale, the position of the work piece to be clamped being shown in dot-dash lines;

Fig. 3 is a fragmentary horizontal sectional view taken substantially on the line indicated at 3—3 in Fig. 1 and on a larger scale;

Fig. 4 is a fragmentary vertical sectional view taken substantially on the line indicated at 4—4 in Fig. 2 and on the same scale as Fig. 3, the neutral position of the driving pin being shown in dot-dash lines;

Fig. 5 is a fragmentary vertical sectional vew taken substantially on the line indicated at 5—5 in Fig. 1 and on the same scale as Fig. 3;

Fig. 6 is a vertical sectional view of the chuck with parts broken away and parts omitted taken substantially on the line indicated at 6—6 in Fig. 2 and on the same scale as Fig. 1;

Fig. 7 is a front elevational view with parts broken away and parts shown in section and on a reduced scale of a modified form of chuck according to the present invention;

Fig. 8 is a vertical sectional view taken substantially on the line indicated at 8—8 in Fig. 7 and on the same scale; and Fig. 9 is a fragmentary horizontal sectional view of the chuck taken substantially on the line 9—9 of Fig. 7.

The chucks shown in the drawings are drawn substantially to scale, and an excellent self-tightening and quick releasing chuck may be made having the same relative size and shape as the chucks shown herein; however, it will be understood that the present invention covers chucks of various other forms quite different in appearance and in functioning from the chucks shown for purposes of illustration in the drawings.

Referring more particularly to the drawings in which like parts are identified with the same numerals throughout the several views, Figs. 1 to 6 show one form of chuck according to the present invention, including a spindle 1 having a body 2 with a cylindrical hub portion 3 and an externally cylindrical peripheral portion 4 and having an internally cylindrical peripheral annulus 5 with axially inner and outer externally cylindrical bearing portions 6 and 7 and an intermediate radially extending portion 8 providing a peripheral spur gear. An attaching screw 9 is provided for rigidly connecting the body 2 to the annulus 5 for rotation in unison therewith. The chuck is mounted in a housing which is split into two sections 10 and 11 to facilitate assembly and which is provided with bearings 12 and 13 for rotatably supporting the spindle, as best shown in Fig. 2. The gear portion 8 of the spindle has teeth which mesh with the teeth of a pinion gear 14 so that the spindle may be driven by the pinion gear. The pinion gear may be driven by a motor and suitable gearing (not shown) in any suitable manner. The housing 10—11 and the driving means for the chuck may, for example, be of the type shown in the co-pending application of Anthony R. Chasar et al., Serial No. 495,124, executed February 25, 1955, filed of even date herewith and entitled Portable Power Unit.

An annular chuck body 15 is rotatably mounted on the spindle 1 for rotation about the spindle. The chuck body has an annular hub portion 16 with an external cylindrical surface rotatably engaging the internal cylindrical surface of the spindle body 2 and of a size to receive a cylindrical work piece of substantial diameter as shown in dot-dash lines in Fig. 2 and has an annular peripheral portion 17 with internal and external cylindrical surfaces rotatably engaging the cylindrical surfaces of the spindle body 2 and the gear-carrying annulus 5. The chuck body is journaled on the spindle for rotation in either direction relative to the spindle but is held against axial movement rearwardly relative to the spindle by a retaining ring 18 at the forward end of the chuck which engages the front face of the hub portion 3. Movement of the chuck body in the opposite direction is prevented by engagement of the peripheral portion 17 with the spindle body 2.

The spindle body 2 and the chuck body 15 are provided with a series of regularly circumferentially spaced radial ways 19 and 20, respectively, each way 19 of the spindle facing and opening to one of the ways 20 of the chuck body. The hub portion 16 of the chuck body provides a central opening 21 of the circular cross section which is of a size to receive the work, and the ways 19 and 20 extend from said opening to the annulus 5. A clamping jaw 22 is mounted for sliding movement in each of the ways 20 radially into and out of a clamping position in gripping engagement with the work and a driving member 23 is mounted for similar sliding movement in each of the ways 19 of the spindle body substantially parallel to one of the clamping jaws. Pairs of parallel oppositely projecting radial guide ribs 24 and 25 are preferably provided in the radial ways 19 and 20, as best shown in Fig. 3, to hold the members 22 and 23 against turning and twisting movements in said ways while permitting movement thereof in the radial direction only in said ways. The clamping jaw members 22 move radially substantially parallel to and substantially in unison with the driving members 23 toward and away from the work pieces in the central opening 21, but the clamping jaws 22 have teeth 26 radially inwardly of the radially inner ends of the driving members 23 which grip the work and normally prevent movement of said driving members against the work.

It will be apparent that torsional load exerted by the cutting tool on the work tend to turn the clamping jaws 22 and the chuck body 15 relative to the driving members 23 and the spindle body 2 and tend to cause movement between the clamping jaws and the driving members 23. According to the present invention means are provided to increase the gripping pressure exerted on the work by the clamping jaws 22 automatically in response to relative movement between the chuck body 15 and the spindle body 2 caused by such torsional loads. Such means may be connected between each clamping member 22 and its associated driving member 23 so as to be directly responsive to relative movement between these members and may include links, levers, gears, or various other mechanisms, but preferably comprises a cam surface on one of said members and a cam member on the other of said members engageable with said cam surface. Such means is preferably constructed so that the chuck is self-tightening in both directions of rotation. Where cam means are interposed between a clamping member 22 and its associated driving member 23, the cam surfaces may be provided with oppositely inclined portions so that the clamping jaws are moved radially toward clamping position automatically when the chuck body is turned in either direction out of a predetermined neutral position.

A simple and inexpensive self-tightening chuck may be made by providing one of the members 22 and 23 with a cam slot and the other of said members with a driving pin which fits in said slot whereby said members can be moved radially substantially in unison to grip or release the work. As herein shown, each of the clamping members 22 is provided with a cam slot 27 and each of the driving members 23 is provided with a cam follower or driving pin 28 which fits in a circular hole in the driving member and in one of the cam slots and limits the radial movement of its associated clamping jaw in either direction with respect to the driving member.

The driving pin 28 may be a cam follower of any suitable cross-section but is shown herein as being externally cylindrical and of circular cross-section. The cam slot 27 of each clamping jaw extends the full width of the radial way 20 and opens at its opposite ends to the opposite side faces of said way. Each slot has a bottom cam surface 29 that is inclined in opposite directions on opposite sides of the medial plane of the radial way 20, whereby the axis of the driving pin 28 is in said plane when said pin is in its neutral position as shown in dot-dash lines in Fig. 4 and the clamping jaw is moved radially inwardly with respect to its associated driving member toward clamping position in response to movement of the driving pin in either direction out of said neutral position. The driving pin 28 is shown herein as being non-rotatable and rigidly connected to the driving member 23 and provides frictional resistance to movement in the cam slot 27 when it is forced against the surface 29 to tighten the clamping jaw 22 on the work. However, the cam follower at 28 may be rotatable, if desired, to facilitate releasing the grip of the jaws on the work when the torsional load on the jaws is reduced.

Each cam slot 27 has an upper cam surface 30 which is engageable with the top of a driving pin 28 to limit radial outward movement thereof relative to the clamping jaws. The surface 30 preferably conforms substantially to the surface 29 and is preferably spaced therefrom a distance substantially equal to the diameter of the driving pin 28 so as to accurately position the clamping jaw relative to its associated driving member, whereby the clamping jaw may be properly located by positioning the driving member at a predetermined radial position. As herein shown, the surfaces 29 and 30 of each cam slot are parallel and spaced apart a distance that is a few thousandths greater than the diameter (about one-half inch as shown herein) of the driving pin 28 and constantly change in slope in a direction away from the medial plane of the clamping jaw, but it will be understood that such surfaces may have a constant slope on each side of said medial plane for example as shown in Fig. 7.

In the chuck shown herein, the cam surfaces 29 and 30 of each cam slot are concentric and cylindrical and have a common axis in the medial plane of their associated clamping jaw 22. The radii of the coaxial cam surfaces shown herein differ by an amount correspondingly substantially to the diameter of the cylindrical driving pin 28 so as to provide each cam slot 27 with a uniform width to accommodate said driving pin.

Although the clamping jaws of the chuck may be constructed for movement more than one inch radially in the radial ways of the chuck body to accommodate rods, pipes and other work pieces of generally cylindrical form, movement of each jaw radially due to relative rotation between the spindle and the chuck body is limited usually to substantially less than one-eighth of an inch since the end faces of each cam slot serve as stops to limit rotational movement of the clamping jaws relative to the driving members. Radial movements of the driving pins 28 relative to the clamping jaws from their neutral positions at the centers of the cam slots 27 due to relative turning movements between the chuck body and the spindle which are caused by torsional thrusts on the clamping jaws by a work piece are preferably not in excess of about one-sixteenth of an inch and need not be greater than one or two hundredths of an inch where the work piece has a relatively hard surface. As shown herein movement of the driving pins 28 in the cam slots 27 causes the clamping jaws 22 to move radially relative to the chuck body a distance no greater than about two hundredths of an inch since said cam slots have a length less than one inch and a relatively small slope. However, by lengthening or redesigning the slots, radial movements of three or four hundredths of an inch may be obtained or any other desired relative radial movement depending on the size and type of work pieces to be gripped.

Means is preferably provided for biasing the driving pins 28 to their neutral positions so that such pins are closest to the radially inner ends of the clamping jaws when the clamping jaws are released from the work. As herein shown, resilient means are provided for yieldably biasing the spindle body 2 and the driving members 23 carried thereby to a predetermined neutral position with respect to the chuck body 15 and the clamping jaws carried thereby. Such resilient means comprise a plurality of V-shaped notches 31 spaced around the circumference of the spindle body 2 and a plurality of detents 32 of a size to fit in said notches. The detents are mounted for axial movement toward and away from the notches in axially extending internally cylindrical sockets 33 which face the notches and are yieldably biased toward the notches by resilient helical springs 34 at the bottoms of the sockets. The detents 32 may be spherical or any other suitable shape but are shown herein as being externally cylindrical and having substantially V-shaped ends of a size to fit in the notches 31. The sockets 33 are so located with respect to the driving pins 28 that each of said pins is in its predetermined neutral position at the medial plane of its associated radial way as shown in dot-dash lines in Fig. 4 when the detents 32 are at their neutral positions at the center of the notches 31 and are a maximum distance into the notches as shown in Fig. 2, whereby the springs 34 and the inclined cam surfaces of the detents and the notches yieldably resist movement of the driving pins out of their neutral positions and bias said pins to said neutral positions whenever the clamping jaws are released from the work. Figures 4 and 5 show in solid lines the relative positions of the driving pin 28 and the detent 32 when the clamping jaws are in work-gripping positions and are moved angularly with respect to the spindle.

Any suitable means may be provided for moving the driving members 23 radially so as to move the clamping jaws 22 into and out of clamping position to grip and release the work. However, such means preferably comprises a rotatable scroll having threads which engage teeth on the driving members to move said members radially in unison. As herein shown, an annular scroll 35 is provided for moving the driving members and the clamping jaws carried thereby radially inwardly and outwardly independently of the cam means 27—28. The scroll is provided with an integral annular hub portion 36 that is journaled for rotation on the hub portion 3 of the spindle about the spindle axis and is held against axial movement with respect to the spindle by means of a retaining ring 37 which fits on an annular groove in the external cylindrical surface of the portion 3.

The face of the scroll 35 is grooved to provide spiral threads 38 normal to the spindle axis, and the side of each driving member 23 is provided with radially spaced, axially projecting teeth 39 which mesh with the threads of the scroll to move the driving member radially in response to rotation of the scroll relative to the spindle. As herein shown, the scroll 35 has a single spiral thread which provides excellent results, but it will be understood that two spiral threads may be provided on the scroll (for example as disclosed in my Patent No. 2,693,966, issued November 9, 1952) so that the lead of the scroll is double that which is provided with a single spiral thread and so that less force is required to release the clamping jaws.

Various means may be provided to rotate the scroll 35 but, in an inexpensive chuck, manual means are usually preferred over power-operated means. In order to tighten and release the clamping jaws during rotation of the spindle in either direction without stopping such rotation, it is preferable to provide a handwheel having an impact driving connection for rotating the scroll. As herein shown, a rotatable annular handwheel 40 is provided at the front of the chuck that has a uniform radial cross section throughout its circumference. The handwheel has an annular hub portion 41 rotatably mounted on the spindle hub portion 3 between the retaining ring 37 and a similar retaining ring 42 which prevents axial movement of the handwheel on the spindle and has a relatively heavy, circumferentially continuous, handgrip portion 43 which provides a peripherally disposed weight with substantial inertia. The handgrip portion extends radially beyond the chuck body and spindle of the chuck so that it may easily be gripped while the spindle is rotating.

The handwheel 40 is provided with a diametrically opposed pair of impact stops or lugs 44 which are engageable with opposite sides of an impact stop or lug 45 to limit the amount of rotation of the handwheel relative to the scroll and to impart sharp hammer blows to the scroll to rotate the same. The lugs 44 and 45 provide an impact driving connection between the scroll and the handwheel whereby the clamping jaws may be readily moved into and out of clamping engagement with the work by imparting a forward or rearward flip to the handwheel during rotation of the spindle in either direction. By rotating the handwheel, sufficient momentum may be applied to the heavy peripheral portion 43 and sufficient hammering action may be applied by the handwheel to the scroll to rotate the scroll relative to the spindle in a direction to lock the clamping jaws or in the opposite direction to release the jaws.

In pipe and rod threading operations, the work holding spindle is usually driven at a speed of not more than about 50 R. P. M. At any speed not substantially in excess of about 100 R. P. M., the operator can easily flip the handwheel 40 forwardly to impart an angular velocity thereto enough greater than the speed of the spindle to release the clamping jaws 22 by impact of one of the lugs 44 against the lug 45 (or if the spindle is rotating in the opposite direction to grip the work). Regardless of the speed or direction of rotation, the rotation of the handwheel may easily be retarded by gripping the peripheral portion 43 or by flipping it rearwardly so as to move the clamping jaws into or out of gripping engagement with the work by impact of the lugs 44 and 45. The chuck shown herein, therefore, may grip and release the work when the spindle is rotating in either direction.

In pipe threading machines, a cut-off is commonly provided adjacent the threading die, so that a portion of the pipe can be cut off after each threading operation.

The chuck of the present invention can be instantly released after the threaded portion has been cut off, and the pipe can be pulled forward the desired amount without stopping rotation of the spindle. When the pipe is properly positioned clamping may be effected by merely retarding rotation of the handwheel 40 (or by imparting a forward flip thereto at a speed faster than that of the spindle if the spindle is being rotated in the opposite direction). Since the above operations can be performed regardless of the direction of rotation of the spindle, both left and right hand threads can be cut in a minimum time.

While the chuck of Figs. 1 to 6 clearly illustrates the principle of the present invention, it will be apparent that the elements of the chuck may be rearranged or replaced with equivalent structures of substantially different construction.

Figures 7 to 9, inclusive, illustrate, by way of example, a modified form of chuck similar to the chuck shown in Figs. 1 to 6 but having the handwheel arranged to form a rotatable housing for the chuck. The modified chuck includes a tubular rotatable driving member 46 that is journaled in a suitable bearing 47 in a housing 48. A spur gear 49 within the housing 48 is shown attached to the tube 46, and this gear may be driven from a motor through any suitable gearing. The housing has an annular plate 50 at its outer end providing a circular opening 51 to receive the chuck.

A spindle 52 having an annular peripheral portion 53 and an annular hub portion 54 is detachably connected to the driving member 46 for rotation in unison therewith by three, regularly circumferentially spaced, attaching screws 55 located in axial bores in said hub portion. The body of the spindle is provided with a series of circumferentially spaced radial ways and a series of driving members 56 mounted for radial sliding movements in said ways.

An annular chuck body 57 is mounted forwardly of the spindle for rotation about the spindle axis. Said chuck body includes an annular hub portion 58 that is journaled in the internally cylindrical portion of the spindle body and an annular peripheral portion 59 that is journaled on the externally cylindrical portion 53 of the spindle body. The chuck body has an annular shoulder 60 which engages the spindle body to limit axial movement of said chuck body rearwardly toward the spindle and has a narrow annular groove which receives a retaining ring 61 to prevent axial movement of the shoulder away from the spindle.

A series of circumferentially spaced clamping jaws 62 are mounted for radial sliding movements in a series of radial ways in the chuck body that face the radial ways of the driving members 56 and each clamping jaw has a cam slot 63 which receives an externally cylindrical driving pin 64.

Each cam slot 63 has cam surfaces, which are inclined in opposite directions on opposite sides of the medial plane of the clamping jaw, and functions like the aforementioned cam slot 27 to move the clamping jaw radially toward clamping position in response to relative rotation of the chuck body with respect to the spindle from a predetermined neutral position wherein the driving pins 64 are midway in the slots 63.

Means is provided for biasing the chuck body toward said predetermined neutral position including a plurality of circumferentially spaced V-shaped notches 65 and a plurality of detents 66. Said detents may be spherical balls but are shown herein as being externally cylindrical and having V-shaped ends to fit in said notches. The detents are mounted for axial sliding movements in cylindrical sockets 67 which face the notches 65 and are biased toward the notches by springs 67. The notches 65 and detents 66 are constructed the same as the notches 31 and detents 32 of the first-described chuck and function in the same manner to bias the driving pins 64 to their neutral positions midway in the cam slots 63 as shown in Fig. 7 and to hold the pins in such positions while the clamping jaws are out of engagement with the work.

The cam slots 63 and the driving pins 64 function substantially the same as the slots 27 and pins 28 of the first-described chuck but the parallel cam surfaces at the top and bottom of each slot 63 are flat and have a constant slope (about 7° as shown herein) on each side of the medial plane of the clamping jaw so as to form a substantially V-shaped cam slot. In the chuck shown herein, each slot 63 is machined with an endmill so as to have a width a few thousandths greater than the diameter (about one-half inch as shown herein) of the externally cylindrical driving pin 64 so that said pin may readily slide from one end of the slot to the other. Rotation of the spindle relative to the chuck body is limited by the engagement of the driving pins 64 with the ends of the cam slots.

Means is provided for moving the driving members 56 and the clamping jaws 62 carried thereby radially into and out of work gripping position independently of the self-tightening means 63—64 including an annular scroll 69 and an annular handwheel 70 mounted for rotation on the spindle 52. The scroll is held against axial movement in either direction on the spindle by an annular shoulder 71 in the spindle hub 54 and a retaining ring 72 mounted in an annular groove in said spindle hub, and the handwheel is held against axial movement in either direction on the spindle by said retaining ring 72 and a similar retaining ring 73 mounted in an annular grove in the rearward end of the hub 54 which is within the housing 48.

The scroll 69 is similar to the scroll 35 and has a face normal to the spindle axis which is spirally grooved to provide axially projecting threads 74. Each driving member 56 also has a face normal to the spindle axis which is grooved to provide axially extending teeth 75 which mesh with the threads 74 of the scroll so that the driving member moves radially when the scroll is rotated relative thereto.

The handwheel 70 has an annular hub portion 76 journaled on the spindle hub 54 in the opening 51 and between the retaining rings 72 and 73 and extends radially outwardly of the spindle and the chuck body to a cylindrical portion 77, which has an internally cylindrical surface rotatably mounted on the external cylindrical surface of the chuck body and an externally cylindrical surface with a diameter less than that of the opening 51. The cylindrical portion 77 extends axially to the front end of the chuck body 57 so as to provide a rotatable housing for the chuck and is integrally joined to a relatively heavy, circumferentially continuous, annular handgrip portion 78 which extends radially outwardly of said cylindrical portion. The handgrip portion provides a peripherally disposed weight whereby a high momentum may readily be obtained by rotating the handwheel manually.

The handwheel is provided with a pair of diametrically opposed impact lugs 79 which are engageable with opposite sides of an impact lug 80 carried by the scroll to limit turning movement of the handwheel relative to the scroll. The impact lugs 79 and 80 provide impact stops of an impact driving connection between the scroll and the handwheel which functions like the impact driving connection 44—45 of the first-desired chuck and permits hammering of the scroll by the handwheel to lock the clamping jaws or to release said jaws.

The tubular driving member 46, the spindle hub 54 and the chuck body hub 58 have axially alined internal cylindrical surfaces enclosing a central opening 81 of a size to receive pipes, tubes, rods and similar work pieces. Each of the radial ways in which the clamping jaws 62 and the radial driving members 56 are mounted opens at one end to the cylindrical portion 77 of the handwheel and at its opposite end to the central work-receiving opening 81. The clamping jaws 62 extend into said central opening and, like the jaws 22, may be moved a substantial distance radially (more than one inch as shown herein) to grip work pieces of various sizes.

In operation a pipe, tube or rod to be threaded is inserted axially through the hollow spindle into the space between the clamping jaws 62, and the handwheel 70 is turned to cause the jaws to lightly clamp the tube or rod. Rotation is then imparted to the spindle and thread cutting tools or the like are brought into engagement with the pipe or rod. The engagement of the cutting tool with the pipe or rod tends to retard rotation of the chuck body relative to the cutting tool and the torsional load so created acts through the driving pins 64 and the cam slots 63 to increase the pressure of the jaw 62 on the work regardless of the angular direction of the torsional load. Radial movement of the clamping jaws due to movement of the pins 64 in the cam slots 63 is usually not in excess of about one-sixteenth of an inch even in the larger chucks and in the chuck shown herein need not exceed about two hundredths of an inch or so; however, such radial movement may be three or four hundredths of an inch or any other desired amount depending on the size and type of work pieces to be gripped and other factors.

It will be understood that, in accordance with the provisions of the patent statutes, variations and modifications of the specific devices disclosed herein may be made without departing from the spirit of the invention.

Having described my invention, I claim:

1. A self-tightening and quick-releasing chuck comprising a spindle having a plurality of circumferentially spaced radial ways; means mounting said spindle for rotation about a fixed axis; a scroll mounted on said spindle for rotation about the spindle axis and having a spirally grooved face normal to the spindle axis; a driving member slidably mounted in each of said ways and having teeth meshing with the grooved face of said scroll whereby said member is moved radially in response to turning movement of said scroll with respect to said spindle; a chuck body rotatably mounted on said spindle and provided with a series of radial ways facing the ways of said spindle; a clamping member slidably mounted in each of said ways for radial movement; means for tightening said clamping jaws in response to movement of said chuck body from a neutral position in either direction with respect to said spindle including a cam slot in one of said members and a driving pin carried by the other of said members and fitting in said slot; yieldable means for biasing said chuck body toward said neutral position; and means for tightening and releasing said clamping jaws during rotation of said spindle comprising a rotatable handwheel coaxial with said spindle and mounted for turning movement with respect to said spindle, said handwheel having a relatively heavy circumferentially continuous handgrip portion radially outwardly of said chuck body and said scroll, impact stops on said handwheel and said scroll engageable to limit turning movements of the handwheel with respect to the scroll and providing an impact driving connection between said handwheel and said scroll, rotation of said handwheel in one direction at an angular velocity greater than that of said spindle causing engagement of said impact stops to impart radial movement to the jaws in one direction and retardation of said handwheel during rotation of said spindle to reduce the angular velocity of the handwheel below that of the spindle causing radial movement of the jaws in the opposite direction, whereby said jaws may be tightened and released during rotation of the spindle in either direction without stopping said spindle.

2. A self-tightening chuck comprising a rotatable mounted spindle, a rotatable scroll coaxial with said spindle and having a spirally grooved face normal to the spindle axis, a chuck body mounted on the spindle for rotation about the spindle axis and provided with radial ways, clamping jaws slidably mounted in said ways, means including a member having teeth meshing with the grooved face of the scroll for moving said clamping jaws radially in response to turning movement of said chuck body with respect to said scroll, and means independent of said scroll and responsive to turning movement of said spindle with respect to said chuck body for moving said clamping jaws in a direction to tighten the same.

3. A self-tightening chuck comprising a rotatably mounted spindle, a rotatable scroll coaxial with said spindle and having a spirally grooved face normal to the spindle axis, a chuck body mounted on the spindle for rotation about the spindle axis and provided with radial ways, clamping jaws slidably mounted in said ways, means including a member having teeth meshing with the grooved face of the scroll for moving said clamping jaws radially in response to turning movement of said scroll with respect to said chuck body, means for tightening and releasing said clamping jaws during rotation of said spindle comprising a rotatable handwheel coaxial with said spindle and mounted for turning movement with respect to said spindle, said handwheel having a circumferentially continuous handgrip portion radially outwardly of said chuck body and said scroll, impact stops on said handwheel and said scroll engageable to limit turning movements of the handwheel with respect to the scroll and providing an impact driving connection between said handwheel and said scroll, rotation of said handwheel in one direction at an angular velocity greater than that of said spindle causing engagement of said impact stops to impart radial movement to the jaws in one direction and retardation of said handwheel during rotation of said spindle to reduce the angular velocity of the handwheel below that of the spindle causing radial movement of the jaws in the opposite direction, whereby said jaws may be tightened and released during rotation of the spindle in either direction without stopping said spindle, and means responsive to movement of said chuck body with respect to said spindle for moving said clamping jaws in a direction to tighten the same during rotation of said spindle whereby said chuck is self-tightening.

4. A self-tightening chuck comprising a rotatable spindle; a series of radially movable clamping jaws mounted for rotation about the axis of said spindle, means responsive to rotational movement of said spindle in one direction with respect to said jaws for moving said jaws in one radial direction, and means responsive to rotational movement of said spindle in the opposite direction with respect to said jaws for moving said jaws in the same radial direction.

5. A self-tightening and quick-releasing chuck comprising a spindle mounted for rotation about a fixed axis, a scroll mounted for rotation about said axis and having a spirally grooved face normal to said axis, a chuck body mounted for rotation about said axis and provided with a plurality of circumferentially spaced radial ways, clamping jaws slidably mounted in said ways, means including a member having teeth meshing with the grooved face of the scroll for moving said clamping jaws radially in response to turning movement of said chuck body with respect to said scroll, a rotatable handwheel mounted for turning movement with respect to said spindle and having a circumferential handgrip portion concentric to said spindle, an impact driving connection between said handwheel and said scroll, and means responsive to turning movement of said chuck body in either direction with respect to said spindle for moving said clamping jaws in a direction to tighten the same.

6. A chuck that is self-tightening in two directions comprising: a rotatable driving member, a chuck body having a clamping member mounted thereon for movement radially inwardly and outwardly, means for moving said clamping member radially including a driving pin carried by one of said members and a cam slot in the other of said members for receiving said pin, said slot being so shaped that one of said clamping members is moved in one direction radially to tighten the jaw when said pin is moved in one direction from a predetermined neutral position in said slot and is moved radially in said one direction when said pin is moved in the opposite direction from said neutral position.

7. A chuck that is self-tightening in two directions comprising: a rotatable driving member, a chuck body having a clamping member mounted thereon for movement radially inwardly and outwardly, means for moving said clamping member radially including a driving pin carried by one of said members and a cam slot in the other of said members for receiving said pin, said slot being generally arcuately curved so that one of said clamping members is moved in one radial direction to tighten said jaw when said pin is moved in one direction in said slot and is moved radially in said one radial direction when said pin is moved in the opposite direction in said slot.

8. A self-tightening chuck comprising a rotary spindle mounted for continuous rotation in one direction; a chuck body mounted for rotation about the spindle axis and provided with radial ways; clamping jaws slidably mounted in said ways for radial movement; means including a handwheel for tightening and releasing said clamping jaws during rotation of said spindle and said chuck body in said one direction, said means including an impact driving connection between said handwheel and said clamping jaws and means responsive to rotation of said handwheel in said one direction and at a velocity greater than that of said jaws to tighten the same during rotation of said spindle and responsive to retardation of said handwheel which reduces its velocity below that of the spindle for imparting radial movement to said jaws in the opposite direction to release the same during rotation of the spindle; and means responsive to movement of said spindle in said one direction with respect to said chuck body due to torsional thrusts for moving said jaws radially in a direction to tighten the same.

9. A self-tightening chuck comprising a rotary spindle mounted for continuous rotation in one direction; a chuck body mounted for rotation about the spindle axis and provided with radial ways; clamping jaws slidably mounted in said ways for radial movement; means including a handwheel for tightening and releasing said clamping jaws during rotation of said spindle and said chuck body in said one direction; means responsive to rotation of said handwheel in said one direction and at a velocity greater than that of said jaws to release the same during rotation of said spindle and responsive to retardation of said handwheel which reduces its velocity below that of the spindle for imparting radial movement to said jaws in the opposite direction to tighten the same during rotation of the spindle; and means independent of said handwheel and said impact driving connection for moving said jaws radially in a direction to tighten the same in response to movement of said spindle in said one direction with respect to said chuck body.

10. A chuck that is self tightening in two directions comprising: a rotatably mounted spindle, a chuck body rotatably mounted on said spindle and having a radial way, a clamping jaw slidably mounted in said way, and means for moving said clamping jaw radially toward clamping position in response to turning movements of said spindle in either direction with respect to said chuck body, said means including relatively movable actuating members, one member being fixed with respect to the spindle and the other member being fixed with respect to said clamping jaw, means responsive to movement of said one member with the spindle in one direction relative to said chuck body and said other member for moving said clamping jaw in a radial direction to tighten the same and responsive to said one member with the spindle in the opposite direction relative to said chuck body and said other member for moving said clamping jaw in the same radial direction.

11. A self-tightening chuck comprising a spindle mounted for rotation about an axis, a clamping jaw mounted for rotation about said axis and mounted for movement radially with respect to said spindle, said clamping jaw being mounted for limited turning movement about said axis and relative to said spindle, means interposed between said spindle and said clamping jaw for moving said clamping jaw radially toward clamping position in response to turning movement of said spindle in one direction with respect to said clamping jaw, and means responsive to turning movement of said spindle in the opposite direction with respect to said clamping jaw for moving said clamping jaw in the same radial direction.

12. A self-tightening chuck comprising a rotatably mounted spindle, a driving member carried by said spindle and rotatable in unison therewith, a chuck body mounted for rotation about the spindle axis and having a radial way, a clamping member slidably mounted in said way for radial movement toward and away from a clamping position, actuating means including a cam carried by one of said members and engageable with the other of said members for moving said clamping member toward clamping position, said actuating means moving said clamping member toward clamping position in response to relative movement of said members in either direction whereby said chuck is self-tightening regardless of its direction of rotation.

13. A self-tightening chuck comprising a rotatably mounted spindle, a driving member carried by said spindle for rotation in unison therewith and mounted for movement radially toward and away from the spindle axis, a clamping jaw mounted for rotation about the spindle axis and connected to said driving member to be driven thereby, said clamping jaw being mounted for radial movement with said driving member and being movable relative to said driving member, means for moving said driving member and said clamping jaws radially inwardly and outwardly, and actuating means connected between said driving member and said clamping jaw for moving said clamping jaw toward clamping position in response to relative rotational movement between said clamping jaw and said driving member in either direction.

14. A self-tightening and quick-releasing chuck comprising a spindle having a plurality of circumferentially spaced radial ways; means mounting said spindle for rotation about a fixed axis and having a spirally grooved face normal to the spindle axis; a driving member slidably mounted in each of said ways and having teeth meshing with the grooved face of said scroll whereby said member is moved radially in response to turning movement of said scroll with respect to said spindle; a chuck body rotatably mounted on said spindle and provided with a series of radial ways facing the ways of said spindle; a clamping member slidably mounted in each of said ways for radial movement; means for tightening said clamping jaws in response to movement of said chuck body from a neutral position in either direction with respect to said spindle including a cam slot in one of said members and a driving pin carried by the other of said members and fitting in said slot; yieldable means for biasing said chuck body toward said neutral position including an axial socket in said chuck body, a V-shaped notch in said spindle adjacent said socket, said socket and said notch facing each other, a detent slidably mounted in said socket and engageable with the bottom portions of the notch and a spring in said socket for yieldably biasing said detent toward said notch; and means for rotating said scroll with respect to said spindle and for tightening and releasing said clamping jaws during rotation of said spindle in either direction.

15. A self-tightening chuck for gripping generally cylindrical work pieces comprising a rotatably mounted spindle, a chuck body mounted for rotation on said spindle and having a plurality of circumferentially spaced radial ways, a plurality of clamping jaws slidably mounted in said ways for movement at least about one-half inch radially to accommodate work pieces of various sizes, means responsive to movement of said chuck body in either direction with respect to said spindle for moving said clamping jaws radially to tighten the jaws, and means independent of the work pieces for limiting radial movement of said jaws due to said last-named means to no more than about one-sixteenth of an inch.

16. A self-tightening chuck comprising a rotatably mounted spindle; a chuck body rotatably mounted on said spindle and having radial ways; clamping jaws slidably mounted in said ways for radial movement into and out of a clamping position; means for moving said jaws radially toward said clamping position in response to movement of said spindle in either direction out of a predetermined neutral position with respect to said chuck body; and resilient means for yieldably biasing said chuck body toward said neutral position including a notch in said spindle having oppositely inclined faces, a detent carried by said chuck body, and means for yieldably biasing said detent toward said notch, said faces being shaped to resist movement of said detent and said chuck body out of said neutral position.

17. A self-tightening chuck comprising a rotatably mounted spindle, a chuck body mounted for rotation about the spindle axis, clamping jaws carried by said chuck body and mounted for movement radially into and out of a clamping position, means interposed between said spindle and said chuck body for biasing said chuck body toward a predetermined neutral position relative to said spindle and for yieldably resisting movement of said chuck body out of said neutral position, and cam means connected between said spindle and said clamping jaws for moving said jaws toward said clamping position automatically in response to movement of said chuck body and the jaws carried thereby in either direction out of said neutral position.

18. A self-tightening chuck comprising a spindle having a plurality of circumferentially spaced radial ways; means mounting said spindle for rotation about a fixed axis; a scroll mounted on said spindle for rotation about the spindle axis and having a spirally grooved face normal to the spindle axis; a driving member slidably mounted in each of said ways and having teeth meshing with the grooved face of said scroll whereby said member is moved radially in response to turning movement of said scroll with respect to said spindle; a chuck body rotatably mounted on said spindle and provided with a plurality of radial ways facing the ways of said spindle; a clamping member slidably mounted in each of said ways for radial movement; means for tightening said clamping jaws in response to movement of said chuck body from a neutral position in either direction with respect to said spindle including a slot in one of said members having oppositely inclined cam surfaces and a driving pin carried by the other of said members for engaging said cam surfaces; and means for rotating said scroll relative to said spindle during rotation of said spindle to tighten and release said clamping jaws during rotation of the spindle in either direction.

19. A self-tightening chuck comprising a spindle having a plurality of circumferentially spaced radial ways; means mounting said spindle for rotation about the spindle axis and having a spirally grooved face normal to the spindle axis; a driving member slidably mounted in each of said ways and having teeth meshing with the grooved face of said scroll whereby said member is moved radially in response to turning movement of said scroll with respect to said spindle; a chuck body rotatably mounted on said spindle and provided with a plurality of radial ways facing the ways of said spindle; a clamping member slidably mounted in each of said ways for radial movement; cam means independent of said scroll for tightening said clamping jaws in response to movement of said chuck body from a neutral position in either direction with respect to said spindle; and means for rotating said scroll relative to said spindle and for tightening and releasing said clamping jaws.

20. A self-tightening chuck comprising a rotatable spindle, a driving member carried by said spindle and mounted for movement radially on the spindle, a chuck body rotatably mounted on said spindle, a clamping jaw member carried by said chuck body and mounted for movement radially on said chuck body into and out of a clamping position, means for yieldably biasing said chuck body to a neutral position with respect to said spindle including a socket having oppositely inclined cam surfaces and a detent for engaging said surfaces, means for moving said clamping jaws radially toward said clamping position in response to movement of said chuck body in either direction from said neutral position including a cam surface on one of said members having oppositely inclined portions and a cam follower carried by the other of said members for engaging said inclined portions, and means including a handwheel having a continuous handgrip portion radially outwardly of said chuck body and said spindle for moving said driving member and said clamping jaw radially into and out of clamping position in response to relative movement between said handwheel and said spindle.

No references cited.